United States Patent
Asano

(10) Patent No.: US 8,330,327 B2
(45) Date of Patent: Dec. 11, 2012

(54) PIEZOELECTRIC OSCILLATOR AND ULTRASONIC MOTOR

(75) Inventor: Hiroshi Asano, Nagaokakyo (JP)

(73) Assignee: Murata Manufacturing Co., Ltd., Nagaokakayo-Shi, Kyoto-fu (JP)

( * ) Notice: Subject to any disclaimer, the term of this patent is extended or adjusted under 35 U.S.C. 154(b) by 0 days.

(21) Appl. No.: 13/108,292

(22) Filed: May 16, 2011

(65) Prior Publication Data

US 2011/0215675 A1 Sep. 8, 2011

Related U.S. Application Data

(63) Continuation of application No. PCT/JP2009/004370, filed on Sep. 4, 2009.

(30) Foreign Application Priority Data

Nov. 25, 2008 (JP) ................................ 2008-299489

(51) Int. Cl.
H02N 2/16 (2006.01)

(52) U.S. Cl. ......... 310/323.06; 310/323.01; 310/323.02; 310/323.03; 310/323.04

(58) Field of Classification Search ............. 310/323.01, 310/323.02, 323.03, 323.04, 323.06, 369
See application file for complete search history.

(56) References Cited

U.S. PATENT DOCUMENTS

| | | | |
|---|---|---|---|
| 5,025,186 A * | 6/1991 | Tsukada | 310/323.06 |
| 5,198,714 A * | 3/1993 | Salomon et al. | 310/323.06 |
| 5,406,160 A * | 4/1995 | Shirasaki | 310/323.06 |
| 6,674,217 B1 * | 1/2004 | Fujimoto | 310/323.06 |
| 7,402,935 B2 * | 7/2008 | Kurosawa | 310/323.04 |
| 2007/0057598 A1 * | 3/2007 | Budinger et al. | 310/323.01 |
| 2008/0238254 A1 * | 10/2008 | Zhou et al. | 310/323.06 |
| 2008/0309193 A1 * | 12/2008 | Ellesgaard et al. | 310/316.02 |

FOREIGN PATENT DOCUMENTS

| | | |
|---|---|---|
| JP | 2-241375 A | 9/1990 |
| JP | 3-243180 A | 10/1991 |
| JP | 7-194151 A | 7/1995 |

OTHER PUBLICATIONS

English Translation of JP 7194151 provided by the JPO online translator, Takashi.*
PCT/JP2009/004370 Written Opinion dated Oct. 10, 2009.
Japan Technology Transfer Association, Solid Element Actuator Kenkyu Bukai Eds., Handbook of New Actuators for Precise Positioning; Fuji Techno Systems; 839-841 (w/ English translation).

* cited by examiner

Primary Examiner — Walter Benson
Assistant Examiner — Bryan Gordon
(74) Attorney, Agent, or Firm — Dickstein Shapiro LLP

(57) ABSTRACT

A piezoelectric oscillator that generates a travelling wave using two B (1, n) mode (n is a natural number) standing waves that are out of phase with each other by 90°. On a lower surface of an oscillating body, (4/3)n piezoelectric elements are provided in order to generate an n-wave travelling wave by combining the two B (1, n) mode standing waves that are out of phase with each other by 90°. When a wavelength of the travelling wave is given by λ, each of the piezoelectric elements has a dimension in a circumferential direction occupying a central angle corresponding to $(1/2)\lambda_\theta$, and a plurality of piezoelectric elements are spaced apart from each other at intervals each occupies a central angle corresponding to $(1/4)\lambda_\theta$.

12 Claims, 6 Drawing Sheets

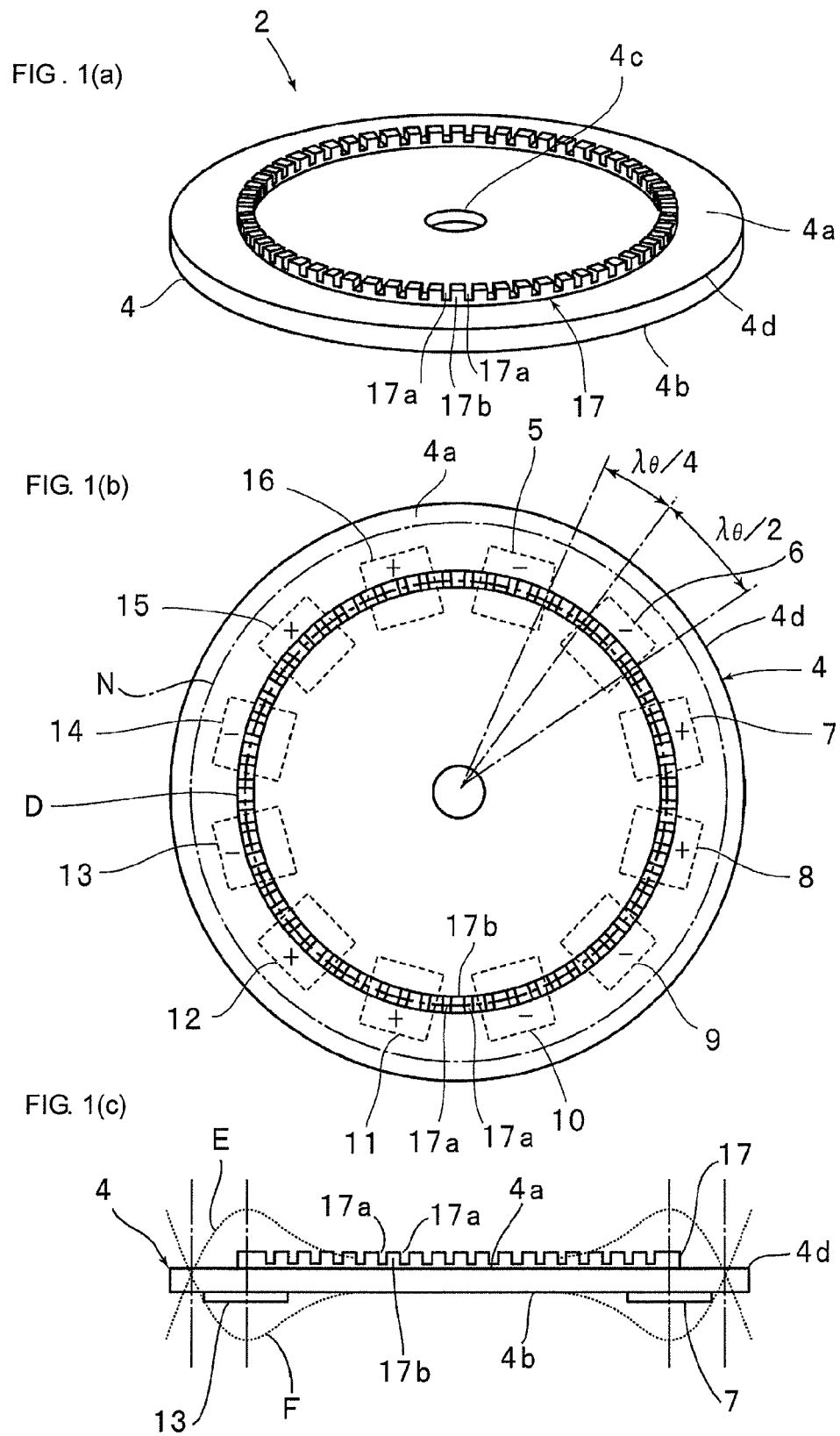

US 8,330,327 B2

PIEZOELECTRIC OSCILLATOR AND ULTRASONIC MOTOR

CROSS REFERENCE TO RELATED APPLICATIONS

The present application is a continuation of International Application No. PCT/JP2009/004370, filed Apr. 9, 2009, which claims priority to Japanese Patent Application No. JP2008-299489, filed Nov. 25, 2008, the entire contents of each of these applications being incorporated herein by reference in their entirety.

FIELD OF THE INVENTION

The present invention relates to piezoelectric oscillators that generate travelling waves using piezoelectric effects and relates to ultrasonic motors using travelling waves generated by the piezoelectric oscillators.

BACKGROUND OF THE INVENTION

To date, a variety of ultrasonic motors using the piezoelectric effects have been proposed. Patent Literature 1 below discloses an ultrasonic motor including a stator in which a discoid piezoelectric element is attached to one surface of a discoid oscillator. FIGS. 8(a) and 8(b) are respectively an outline front sectional view illustrating the ultrasonic motor described in Patent Literature 1 and a schematic plan view of the oscillator explaining a polarization structure of the piezoelectric element on a lower surface.

In an ultrasonic motor 101 that is disclosed in Patent Literature 1, two B (1, 3) mode standing waves that are out of phase with each other by 90° are generated, and a travelling wave is generated by combining the two standing waves.

The ultrasonic motor 101 includes a support plate 102. A central shaft 103 is attached at the center of the support plate 102. The central shaft 103 extends upward from the center of the support plate 102. A stator 104 is secured to the central shaft 103, thereby holding the stator 104 with the central shaft 103 and the support plate 102.

The stator 104 includes a discoid oscillator 105 and a discoid piezoelectric element 106 that is attached to a lower surface of the oscillator 105. As illustrated in FIG. 8(b), the piezoelectric element 106 is divided into 12 sector areas each having a central angle of 30°. Each sector area is polarized in the thickness direction as indicated by "+" or "−" signs in the figure. The sector areas indicated as "+" and the sector areas indicated as "−" are polarized in opposite thickness directions. In order to obtain an n-wave travelling wave (n is a natural number) by generating B (1, n) mode or B (0, n) mode standing waves, the piezoelectric body needs to be divided into 4n areas. Here, n is a natural number. Thus, in Patent Literature 1, the piezoelectric element 106 is divided into 12 areas in order to obtain a three-wave travelling wave.

The piezoelectric element 106 includes electrodes formed on two opposite surfaces of a polarized piezoelectric ceramic plate. By applying an alternating voltage to the piezoelectric element 106, areas indicated by the "+" sign and areas indicated by the "−" sign as described above oscillate with phases opposite to each other, thereby oscillating the oscillator 105 attached to the piezoelectric element 106. With this oscillation, displacement is repeated between an oscillation mode indicated by dotted line A and an oscillation mode indicated by dotted line B in FIG. 8(a), and, B (1, 3) mode standing waves are generated. By driving the piezoelectric element 106 so as to generate two standing waves that are out of phase with each other by 90°, a travelling wave having a diameter smaller than the oscillator 105 is generated.

A protrusion 105a are formed on an upper surface of the oscillator 105 in a radial direction in which the travelling wave propagates, and an unshown rotor is disposed on an upper surface of the oscillator 105 so as to contact the protrusion 105a. The rotor is supported by the central shaft 103 so as to be a rotating member rotating about the central shaft 103. Thus, by generating the above-described travelling wave, the rotor contacted by the protrusion 105a is rotated about the central shaft 103.

Non Patent Literature 1 below discloses ultrasonic motors using the B (1, n) mode including the above-described B (1, 3) mode and the B (0, n) mode.

Patent Literature 1: Japanese Unexamined Patent Application Publication No. 7-194151

Non Patent Literature 1: Japan Technology Transfer Association, Solid Element Actuator Kenkyu Bukai (Solid Element Actuator Research Working Group) Eds.; "Kakudai Kino Wo Yusuru Disc-gata Cho-onpa Motor (Disc-type ultrasonic motor having enhancement features)"; Handbook of New Actuators for Precise Positioning; Fuji Techno Systems; 839-841.

In the ultrasonic motor 101 described in Patent Literature 1, the rotor is rotated due to generation of the travelling wave generated by combining two B (1, 3) mode standing waves that are out of phase with each other by 90°. Although rotation efficiency in this case is comparatively high, the substantially discoid piezoelectric element 106 needs to be divided into 12 areas and each area needs to be polarized in order to realize the ultrasonic motor 101. For this reason, a forming process and a polarizing process of the piezoelectric body is complex, and formation of the electrodes also needs to be complex. Thus, the cost of the ultrasonic motor cannot be reduced.

SUMMARY OF THE INVENTION

An object of the present invention is to provide an ultrasonic motor that uses a travelling wave of a B (1, n) mode with which large oscillation energy can be easily obtained. This ultrasonic motor allows the forming process, the polarizing process and the electrode forming process of the piezoelectric body to be simplified, the cost to be reduced, and a variety of B (1, n) modes to be easily used.

According to the present invention, the following piezoelectric oscillator is provided. That is, an piezoelectric oscillator that includes an oscillating body formed of a plate-shaped material having a circular or polygonal circumference, and (4/3)n piezoelectric elements that are secured to at least one of main surfaces of the oscillating body in order to generate an n-wave travelling wave (n is a natural number). The travelling wave is generated by combining two B (1, n) mode standing waves that are out of phase with each other by 90° due to oscillation of the oscillating body. The travelling wave travels so as to travel in a circular path, and the piezoelectric elements is distributed in the circumferential direction of the travelling wave, in which, when a central angle around a center of the circumferential direction corresponding to a wavelength of the travelling wave is given by $\lambda_\theta$, each piezoelectric element has a dimension corresponding to a central angle of $\lambda_\theta/2$, and adjacent piezoelectric elements are spaced apart from each other at intervals each corresponding to a central angle of $\lambda_\theta/4$ in the circumferential direction, and in which each piezoelectric element includes a piezoelectric body polarized in a thickness direction and a pair of electrodes formed on two opposite surfaces of the piezoelectric element. The piezoelectric bodies of the piezoelectric elements are polarized in one or the other thickness direction so as to alternate for every two piezoelectric elements in the circumferential direction.

In a particular aspect of the piezoelectric oscillator according to the present invention, the plurality of piezoelectric elements are disposed so as to be positioned on antinodes of oscillation of the B (1, n) mode standing waves. In this case, two standing waves that are out of phase with each other can be generated more efficiently.

In another particular aspect of the piezoelectric oscillator according to the present invention, the plurality of piezoelectric elements are disposed on the antinodes of the oscillation of the standing waves positioned inside annular nodes of the B (1, n) mode standing waves. In this case, the two standing waves can be generated even more efficiently.

In yet another particular aspect of the piezoelectric oscillator according to the present invention, the plurality of piezoelectric elements are disposed inside the annular nodes of the oscillation of the B (1, n) mode standing waves so as not to extend to the outside of the nodes. Since the plurality of piezoelectric elements do not extend outside of the nodes of the oscillation in this case, generation of standing waves in reversed phase can be suppressed. Thus, lowering of driving efficiency can be suppressed.

According to the present invention, the planar shape of the piezoelectric elements is not particularly limited. However, in another particular aspect according to the present invention, the piezoelectric elements each have a rectangular planar shape. In this case, the plurality of piezoelectric elements can be easily formed from a mother piezoelectric body in high productivity.

In yet another particular aspect of the piezoelectric oscillator according to the present invention, at least a contact is further provided so as to protrude from the surfaces of the oscillating body on a surface that contacts the rotor of the oscillator. By making the top end of the protruding contact be in contact with a driven member such as a rotor, the rotor and the like can be driven even more efficiently.

In yet another particular aspect according to the present invention, the at least a contact includes a plurality of the contacts that are distributed in an annular area where the travelling wave of the oscillation of the B (1, n) mode propagates on the main surfaces of the oscillating body. In this case, the rotor and the like can be driven even more efficiently.

An ultrasonic motor according to the present invention includes a stator including the piezoelectric oscillator structured in accordance with the present invention, and a rotor arranged so as to contact the stator and rotated due to oscillation caused by the travelling wave generated in accordance with the stator.

In the piezoelectric oscillator according to the present invention, (4/3)n piezoelectric elements are distributed in the circumferential direction of the travelling wave so as to be in the above-described particular relationship with each other on at least one of the main surfaces of the oscillator formed of a plate-shaped material. By doing this, the travelling wave is generated by combining two B (1, n) mode standing waves that are out of phase with each other. This travelling wave causes displacement in the oscillator larger than that caused by using a travelling wave generated by combining B (0, n) mode standing waves. Thus, members driven by the piezoelectric oscillator such as a rotor can be efficiently rotated.

In addition, only the structure provided is that the plurality of the piezoelectric elements are secured to at least one of the main surfaces of the oscillator so as to be in the above-described particular relationship with each other. In addition, in order to generate the n-wave travelling wave generated by combining two B (1, n) mode standing waves that are out of phase with each other by 90°, it is sufficient only to secure (4/3)n single polarization piezoelectric elements. This allows the forming process, the polarizing process, and the electrode forming process of the piezoelectric elements to be significantly simplified, and the cost to be significantly reduced compared to the related art example that uses a single annular or discoid piezoelectric element having 4n divided and polarized areas.

BRIEF DESCRIPTION OF THE DRAWINGS

FIGS. 1(a) and 1(b) are respectively a perspective view and a plan view illustrating a stator of an ultrasonic motor of an embodiment according to the present invention. FIG. 1(c) is a front view of the stator explaining two standing waves generated in the stator.

DETAILED DESCRIPTION OF THE INVENTION

The present invention will be clarified below by describing specific embodiments of the present invention with reference to the drawings.

Figure 3:
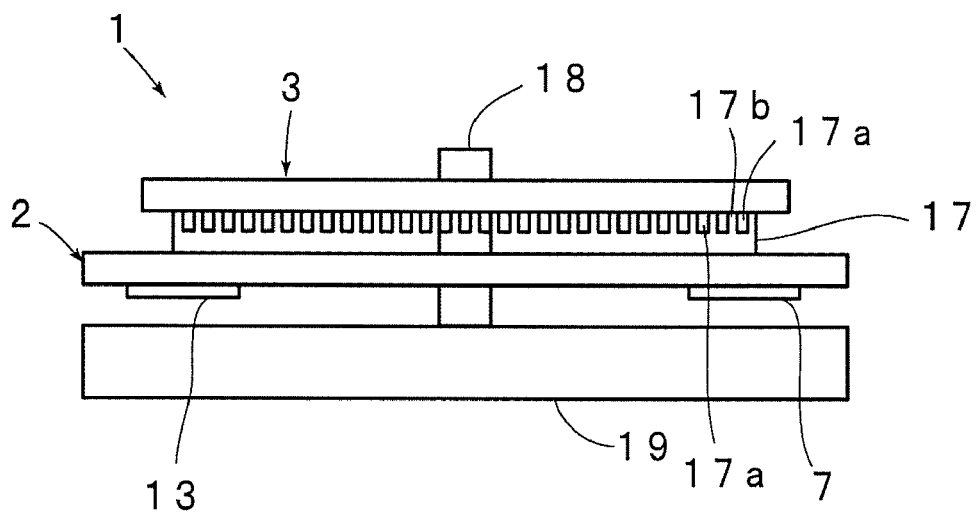
FIG. 3 is a front view of the ultrasonic motor of the embodiment according to the present invention.

FIG. 3 is a front view of an ultrasonic motor of a first embodiment according to the present invention. An ultrasonic motor 1 includes a stator 2 that includes a piezoelectric oscillator, which is an embodiment according to the present invention, and a rotor 3 rotated by the stator 2. The rotor 3 of the present embodiment has a substantially discoid shape and rotates about the center of the disc. The rotor 3 is formed of an appropriate stiff material such as metal, ceramics, or synthetic resin. In the present embodiment, two B (1, 9) mode standing waves that are out of phase with each other by 90° in time and position, which will be described later, are generated in the stator 2. A travelling wave, which is generated by combining the two standing waves, rotates the rotor 3.

FIGS. 1(a) and 1(b) are respectively a perspective view and a plan view illustrating the appearance of the stator 2. FIG. 1(c) is a schematic front view explaining the standing waves generated in the stator 2.

The stator 2 includes an oscillating body 4 formed of a plate-like elastic material. The oscillating body 4 has a discoid shape with a through hole 4c formed at the center. The oscillating body 4 may instead have an annular shape.

The planar shape of the oscillating body 4 is not limited to a discoid or annular shape. The oscillating body 4 may have a regular polygonal planar shape such as a regular hexagon, a regular octagon, or a regular decagon.

The above-described oscillating body 4 of the present embodiment is formed of phosphor bronze. However, the oscillating body 4 needs not be formed of metal such as phosphor bronze. The oscillating body 4 may be formed of other elastic material such as ceramics, a silicon material, or synthetic resin. The above-described oscillating body 4 can be easily formed to have a precise shape using a punching process or the like.

Figure 2A:
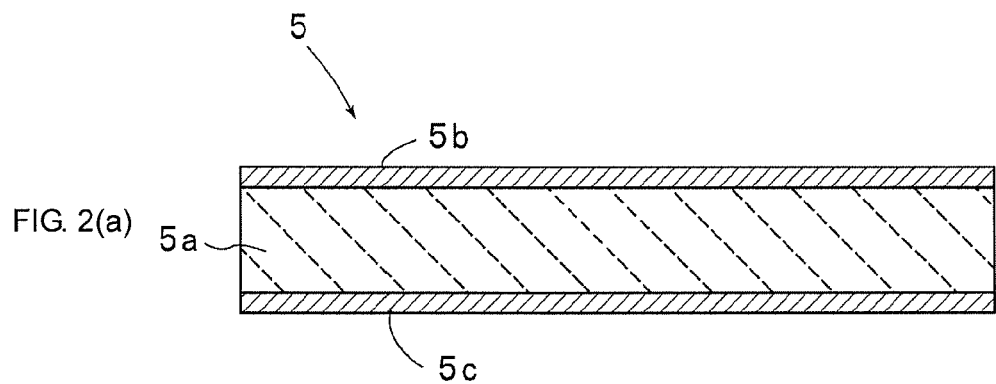
FIG. 2(a) is a front sectional view of a piezoelectric element explaining the structure of the piezoelectric element secured to the stator of the ultrasonic motor of the embodiment according to the present invention.

A plurality of piezoelectric elements 5 to 16 are attached on a lower surface 4b of the oscillating body 4. FIG. 2(a) is an enlarged front sectional view schematically illustrating the piezoelectric element 5. The piezoelectric element 5 includes a piezoelectric body 5a having been polarized in the thickness direction, a first electrode 5b formed on an upper surface of the piezoelectric element 5, and a second electrode 5c formed on a lower surface of the piezoelectric body 5a. The above-described piezoelectric body 5a can be formed of a piezoelectric ceramic such as lead zirconate titanate ceramic or an appropriate piezoelectric material such as a piezoelectric single crystal.

The first and second electrodes 5b and 5c are formed of an appropriate metal material such as Al, Ag, Cu, or an alloy of these materials.

The piezoelectric elements 6 to 16 have structures similar to that of the piezoelectric element 5. However, in order to excite the two separate B (1, 9) mode standing waves that are out of phase with each other by 90°, which will be described later, polarization directions of the piezoelectric bodies of the piezoelectric elements are inverted in the thickness direction of the piezoelectric bodies such that two adjacent similarly polarized piezoelectric bodies have a polarization direction that opposes the polarization direction of the previous or next two adjacent piezoelectric bodies. That is, if the piezoelectric body 5a is polarized in a direction from the lower surface to the upper surface in each of the piezoelectric elements 5 and 6, the polarization is directed from the upper to lower surfaces in the piezoelectric elements 7 and 8. In FIG. 1(b), the polarization direction from the upper surfaces to the lower surfaces of the piezoelectric bodies is indicated by "+", and the polarization direction from the lower surfaces to the upper surfaces of the piezoelectric bodies is indicated by "−".

Although a set of the piezoelectric elements 7 and 8 are disposed next to a set of the piezoelectric elements 5 and 6 in the above-described circumferential direction in the present embodiment, a piezoelectric element, which is polarized in the above-described plus direction or the minus direction, may be disposed between, for example, the set of piezoelectric elements 5 and 6 and the set of piezoelectric elements 7 and 8. Alternatively, one piezoelectric element may be omitted from either of the sets of the piezoelectric elements, for example, the set of 5 and 6 and the set of 7 and 8. This is not desirable since exciting efficiency of the B (1, 9) mode standing waves is reduced. However, a structure in which one or some piezoelectric elements are added or omitted in some part as described above may not be excluded from the scope of the present invention.

The piezoelectric elements 5 to 16 are secured to the lower surface of the oscillating body 4 using an appropriate jointing material (not shown). As an appropriate adhesive, a jointing material formed of metal, or the like may be used, for example.

In order to apply an alternating current voltage to the plurality of piezoelectric elements 5 to 16, wiring is appropriately routed to the second electrodes on the lower surfaces of the piezoelectric elements 5 to 16. The first electrodes provided on the upper surfaces of the piezoelectric elements are connected to common wiring.

As illustrated in FIG. 1(b), the piezoelectric elements 5 to 16 of the present embodiment each have a rectangular planar shape. Thus, by forming the electrodes on both surfaces of a large mother piezoelectric body, polarizing the piezoelectric body in the thickness direction, and then cutting the piezoelectric body such that each divided piece has a rectangular shape, a number of the piezoelectric elements 5 to 16 can be easily formed with high precision. Thus, a polarization process can be simplified. It is sufficient that the plurality of piezoelectric elements 5 to 16 are attached on the lower surface of the oscillating body 4. Thus, a manufacturing process of the stator 2 can be simplified and the cost can be reduced. This reduces the cost of the ultrasonic motor 1.

Figure 2B:
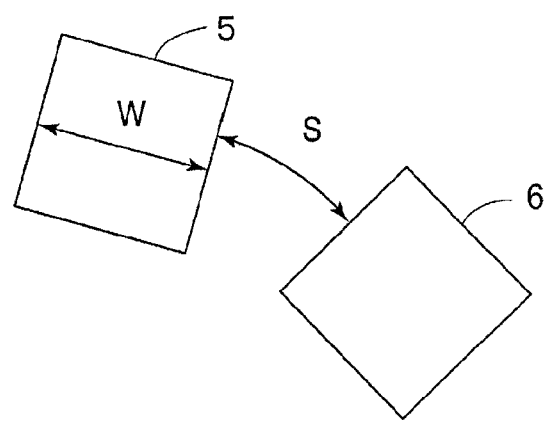
FIG. 2(b) is a schematic plan view explaining the dimension of the piezoelectric element and the distance between the piezoelectric elements.

The plurality of piezoelectric elements 5 to 16 are distributed along a certain circumferential direction in the oscillating body 4. More specifically, when $\lambda_\theta$ is a central angle corresponding to a wavelength of the travelling wave generated along the annular area in which the B (1, 9) mode standing waves are generated, as schematically illustrated in FIG. 2(b), each of the piezoelectric elements 5 and 6 has a length W in the circumferential direction that occupies a central angle equal to $(1/2)\lambda_\theta$, and the plurality of piezoelectric elements 5 and 6 are spaced apart from each other by a gap S that occupies a central angle equal to $(1/4)\lambda_\theta$. The other piezoelectric elements 7 to 16 are disposed in a similar manner.

More specifically, in the present embodiment, the above-described travelling wave propagates along a virtual circle D indicated by a dashed line inside a circumference 4d of the discoid oscillating body 4 in FIG. 1(b). Thus, radial positions of the plurality of piezoelectric elements 5 to 16 in the oscillating body 4 are determined such that the center of each of the piezoelectric elements 5 to 16 is positioned in the virtual circle D.

In the stator 2, by applying two high-frequency voltages out of phase with each other in time respectively to a first piezoelectric element group including the piezoelectric elements 5, 7, 9, 11, 13, and 15, and a second piezoelectric element group including the piezoelectric elements 6, 8, 10, 12, 14, and 16 out of the piezoelectric elements 5 to 16, two B (1, 9) mode standing waves that are out of phase with each other by 90° in time and position are generated. The two standing waves are combined and the travelling wave is generated. That is, the travelling wave that propagates along the virtual circle D is generated.

When the travelling wave is generated, the oscillating body 4 repeatedly oscillates between an oscillation mode indicated by dotted line E and another oscillation mode indicated by dotted line F in FIG. 1(c). In this case, as clearly seen in FIG. 1(c), the oscillating body 4 undergoes the maximum displacement in up and down directions at the centers of the piezoelectric elements 7 and 13 in the radial directions of the oscillating body 4. That is, the maximum displacement that occurs in the oscillating body 4 is the value in the virtual circle D. This virtual circle D corresponds to antinodes of the oscillation of the above-described B (1, 9) mode standing waves.

Figure 4:
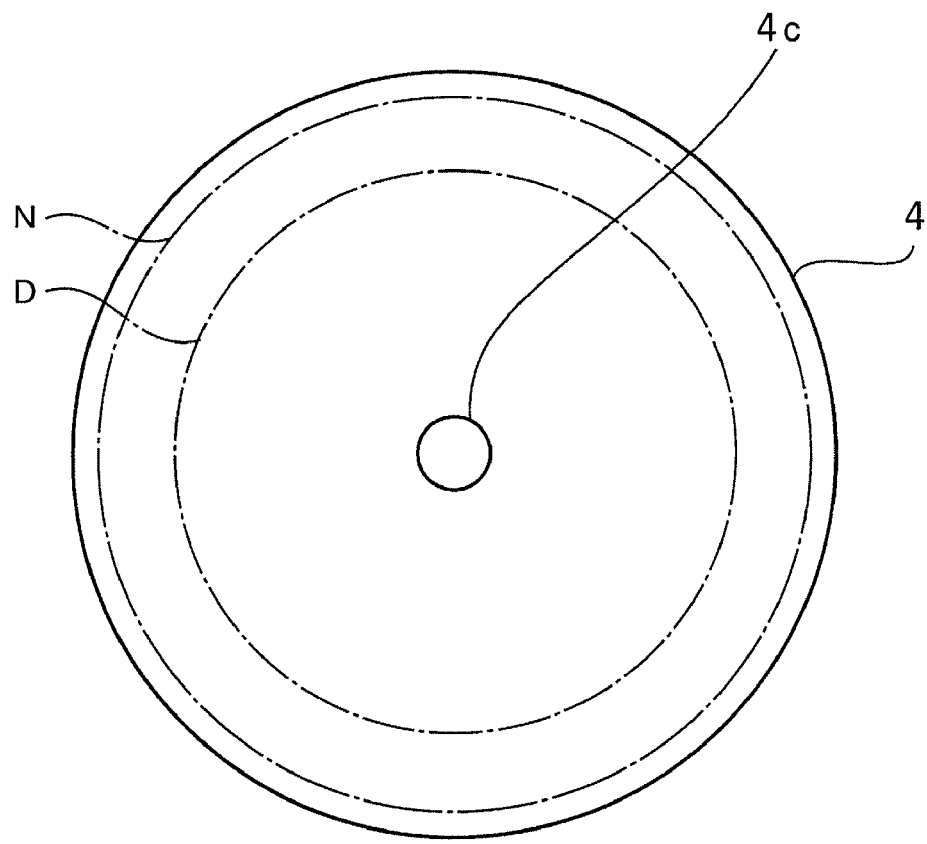
FIG. 4 is a schematic plan view illustrating positions of annular nodes N of oscillation of a B (1, 9) mode standing waves generated in a piezoelectric oscillator and the positions of antinodes D that undergo the maximum displacement in the embodiment of the present invention.

As illustrated in a schematic plan view in FIG. 4, annular nodes N, which correspond to nodes of the oscillation of the standing waves, exist outside the virtual circle D. As illustrated in FIG. 1(c), displacement rarely occurs in the oscillation nodes N, and the antinodes that undergo the maximum displacement exist outside the nodes N.

In the present embodiment, the piezoelectric elements 5 to 16 are positioned in the virtual circle D that corresponds to the oscillation antinodes, and do not extend to the outside of the oscillation nodes N. If the piezoelectric elements 5 to 16 extend to the outside of the nodes N, the piezoelectric elements 5 to 16 are also positioned in an area that is driven in a reversed phase. This is not desirable since exciting efficiency is reduced.

Figure 6:
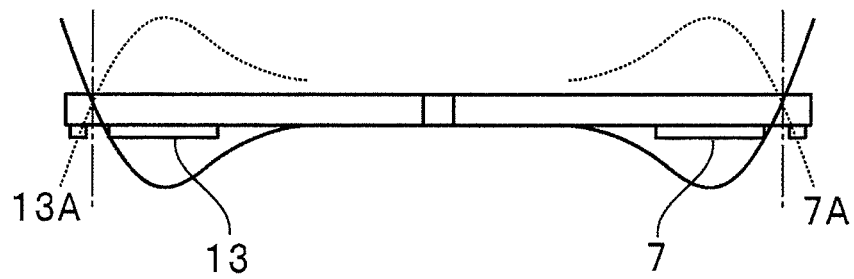
FIG. 6 is a schematic front view explaining the relationship between the positions of the piezoelectric elements and standing waves in a modification of the embodiment according to the present invention.

However, piezoelectric elements respectively polarized in directions opposite those of the piezoelectric elements 5 to 16 may be provided outside the oscillation nodes N. For example, as illustrated by an area where the piezoelectric elements 7 and 13 are provided in FIG. 6, piezoelectric elements 7A and 13A may be provided outside the piezoelectric elements 7 and 13. In this case, the travelling wave can be generated also by driving the piezoelectric elements positioned on both sides of the oscillation nodes N.

In the present embodiment, radial positions of the piezoelectric elements 5 to 16 in the oscillating body 4 are determined such that the center of each of the piezoelectric elements 5 to 16 is positioned in the virtual circle D. In other words, the piezoelectric elements 5 to 16 are positioned such that the centers of the piezoelectric elements 5 to 16 each match the peak of the oscillation when the B (1, 9) mode travelling wave is generated. Thus, by driving the piezoelectric elements 5 to 16, the B (1, 9) mode travelling wave can be efficiently excited. In addition, rotation efficiency of the rotor can be improved by a plurality of contacts, which will be described later, being disposed in the virtual circle D.

In the present embodiment, with respect to the plurality of piezoelectric elements 5 to 16, the above-described piezoelectric elements 5, 7, 9, 11, 13, and 15 of the first group and the piezoelectric elements 6, 8, 10, 12, 14, and 16 of the second group are respectively disposed symmetrically relative to the center of one surface of the oscillating body 4. Thus, there is a resistance to effects caused by variations of the stators 2 in manufacturing, or a resistance to an unbalanced pressurization state of the rotor 3. Accordingly, stability of the ultrasonic motor 1 can be improved.

When a B (1, n) mode travelling wave is used, efficiency can be improved compared to a case in which a known B (0, n) mode travelling wave is used. The reason is as follows. That is, an area that undergoes the maximum displacement in oscillation of an oscillating body caused by a B (1, n) mode travelling wave, that is, an area where the above-described travelling wave propagates, is inside the periphery of the discoid oscillating body. Thus, compared to a case in which a travelling wave of a B (0, n) mode is used, which propagates in the periphery of the discoid oscillating body, the oscillating area is radially enlarged, thereby increasing oscillation energy and increasing the amount of displacement in an area that undergoes the maximum displacement. As a result, compared to a case in which a travelling wave of a B (0, n) mode is used, the rotor contacted by the stator 2 can be efficiently rotated by using the B (1, n) mode travelling wave.

In the above-described embodiment, in order to rotate the rotor 3 more effectively, a plurality of contacts protrude upward from an upper surface 4a of the oscillating body 4 on the upper surface 4a of the oscillating body 4 in the stator 2. More specifically, an annular wall 17 is formed in a position where the virtual circle D is provided on the upper surface 4a of the oscillating body 4. On an upper surface of the annular wall 17, a plurality of cuts 17a are formed so as to extend in the radial directions of the oscillating body 4 and to be spaced apart at regular intervals in the circumferential direction. A protrusion between adjacent cuts 17a forms a contact 17b. Thus, a plurality of the contacts 17b are formed so as to upwardly protrude from the upper surface 4a of the oscillating body 4. The plurality of the contacts 17b are distributed on a path where the B (1, n) mode travelling wave described above propagates. More specifically, the plurality of the contacts 17b are distributed in the circumferential direction of the virtual circle D, that is, disposed in the above described area that undergoes the maximum displacement.

Since the contacts 17b protrude from the oscillating body 4 side in directions that separate away from the oscillating body 4, the top ends of the contacts 17b are displaced more largely when the B (1, n) mode travelling wave is generated in the oscillating body 4, and the oscillating body 4 is displaced in the area where the virtual circle D is positioned.

The through hole 4c illustrated in FIG. 1(a) is formed in order to allow, for example, a center shaft to pass therethrough. The center shaft is centered at the rotor 3 and the stator 2. A through hole similar to the through hole 4c is formed in the rotor 3. Thus, the stator 2 and the rotor 3 can be held with, for example, a holding member including a central shaft 18 and a base plate 19 as illustrated in FIG. 3. In this case, the rotor 3 is rotatably supported about the central shaft at a through hole 3a, and the stator 2 is secured to the central shaft 18 at the through hole 4c of the oscillating body 4. The central shaft 18 is appropriately secured to the base plate 19.

The above-described central shaft 18 is formed of an appropriate stiff material such as metal or ceramics.

Figure 7:
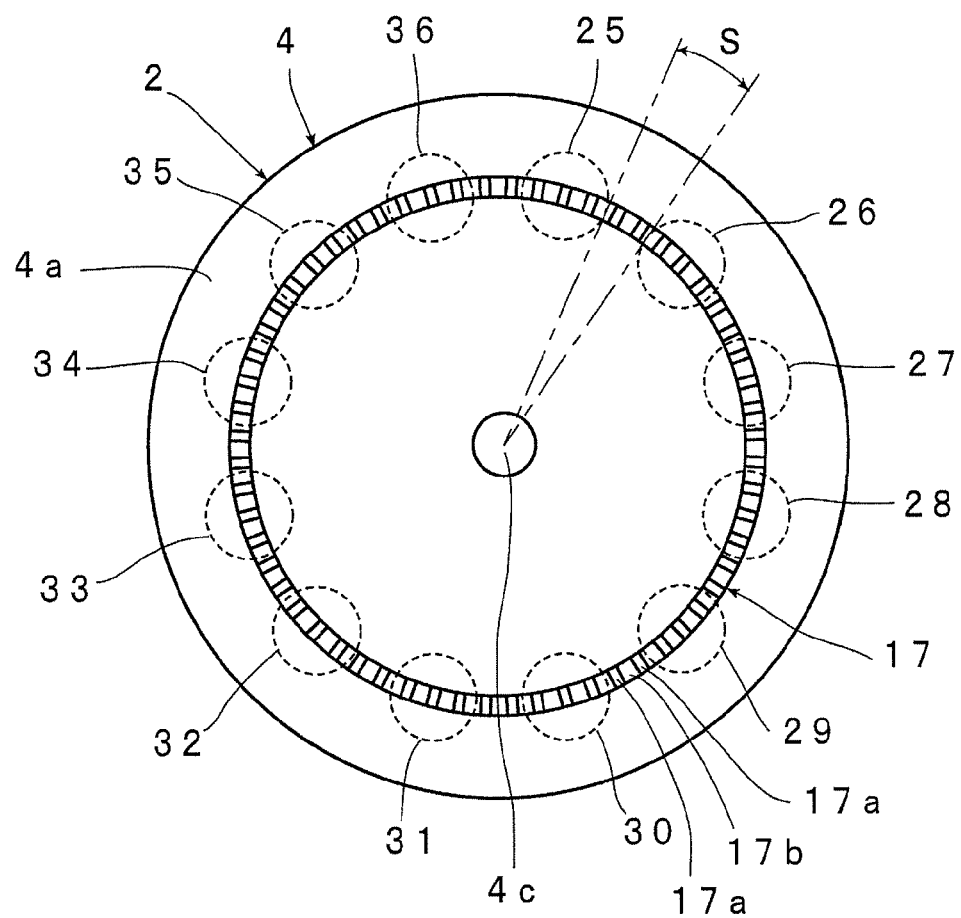
FIG. 7 is a plan view of the stator in the modification of the ultrasonic motor according to the present invention.
Figure 8A:
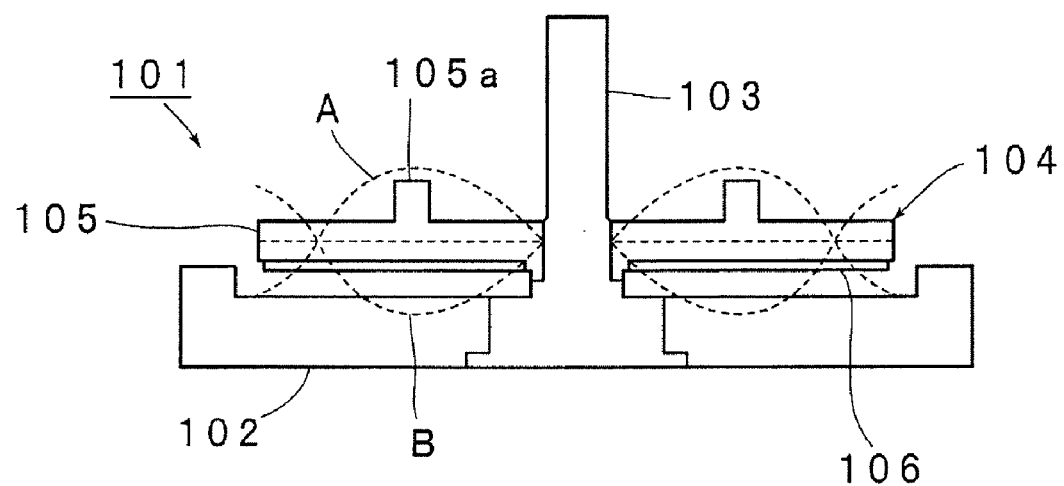
FIGS. 8(a) and 8(b) are respectively a schematic front view explaining a related-art ultrasonic motor using a B (1, n) mode travelling wave and a schematic plan view illustrating the polarization structure of the piezoelectric element attached to a lower surface of the stator.
Figure 8B:
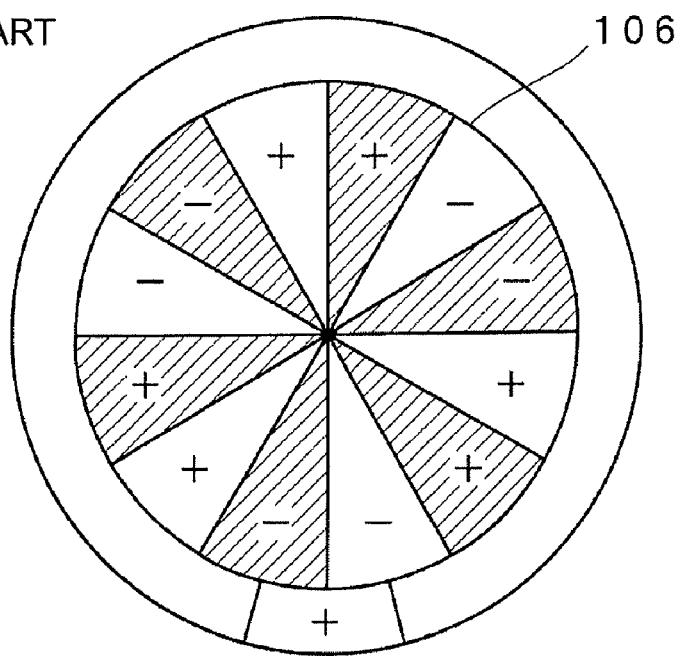

The ultrasonic motor 1 of the above-described embodiment is not particularly limited. Although the piezoelectric elements 5 to 16 have a rectangular planar shape, piezoelectric elements 25 to 36 having a circular planar shape as in a modification illustrated in FIG. 7 may be used. As in the case with the rectangular piezoelectric elements 5 to 16, the circular piezoelectric elements 25 to 36 can also be easily formed. However, in order to increase a yield from a mother piezoelectric body, the rectangular piezoelectric elements 5 to 16 are desirable.

In the above-described embodiment, an example is described, in which the B (1, 9) mode travelling wave is used. However, other B (1, n) modes may be used. For example, in order to used a B (1, x) mode, (4/3)x piezoelectric elements may be distributed in the circumferential direction.

Figure 5:
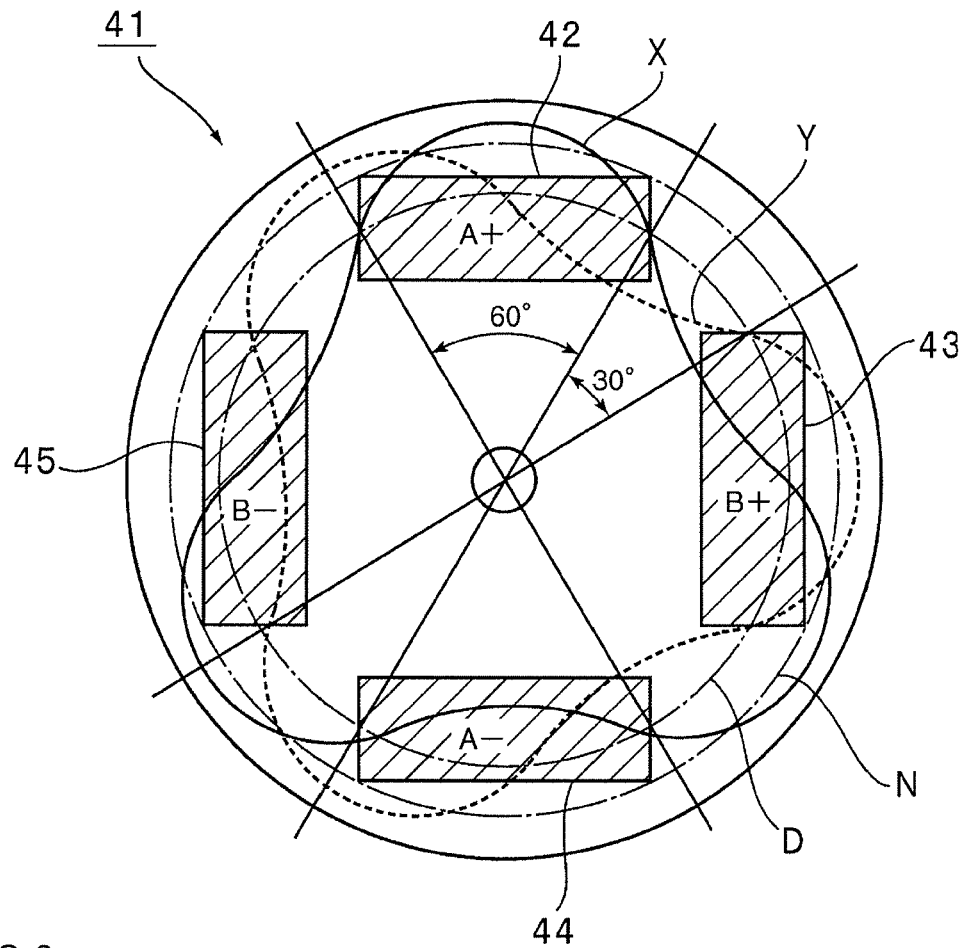
FIG. 5 is a plan view schematically illustrating two B (1, 3) mode standing waves that are out of phase with each other by 90° in the piezoelectric oscillator that uses the B (1, 3) mode standing waves according to the present invention.

FIG. 5 is a schematic plan view that further clarifies a travelling wave generated in accordance with the present invention. Here, three-wave standing waves X and Y are illustrated. That is, in a discoid-shaped piezoelectric oscillating body 41, four piezoelectric elements 42 to 45 are spaced apart from each other at 30° central angular intervals. The piezoelectric elements 42 to 45 each have a dimension in the circumferential direction that occupies a 60° central angle. That is, since the three-wave standing waves X and Y are excited, the central angle relative to the wavelength of the travelling wave is 120°. The dimension of each piezoelectric element in the circumferential direction is a dimension corresponding to the central angle of 120°/2=60° while adjacent piezoelectric elements are spaced apart from each other at intervals each corresponding to a central angle of 120°/4=30°. In this case, as illustrated in the figure, the three-wave standing waves X and Y, which are out of phase with each other by 90°, are exited. The both waves are combined and the travelling wave is generated.

In FIG. 5, "A+", "A−", "B+", and "B−" denote polarization directions of the piezoelectric bodies, where "+" indicates that the piezoelectric body is polarized from an upper surface to a lower surface in the thickness direction, and "−" indicates that the piezoelectric body is polarized in the opposite direction.

"A" indicates that the piezoelectric element is one of the first group piezoelectric elements 42 and 44, and "B" indicates that the piezoelectric element is one of the second group piezoelectric elements 43 and 45.

For the convenience of illustration in the figure, an example of a three-wave case is illustrated in FIG. 5. However, also in the nine-wave case of the above-described embodiment, the two standing waves, which are out of phase with each other by 90° as in the case with the three-wave, are excited and, by combining both of the waves, the travelling wave is generated.

As described above, the present invention can be widely applicable to ultrasonic motors using a B (1, n) mode, thereby allowing the polarization operation and the manufacturing process to be simplified and the cost to be reduced in accordance with the present invention.

REFERENCE NUMBER LIST 1 ultrasonic motor
2 stator
3 rotor
3a through hole
4 oscillating body
4a upper surface
4b lower surface
4c through hole
4d circumference
5-16 piezoelectric element
5a piezoelectric body
5b first electrode
5c second electrode
7A, 13A piezoelectric element
17 annular wall
17a cut 17b contact
18 central shaft 19 base plate
25-36 piezoelectric element
41 piezoelectric oscillating body
42-45 piezoelectric element

The invention claimed is:

1. A piezoelectric oscillator comprising:
    an oscillating body having a circumference and first and second surfaces; and
    (4/3)n piezoelectric elements secured to the first surface of the oscillating body and configured to generate an n-wave travelling wave that travels in a circular path by combining two B (1, n) mode standing waves that are out of phase with each other by 90° due to oscillation of the oscillating body, the (4/3)n piezoelectric elements being distributed in a circumferential direction of the travelling wave, and where n is a natural number,
    wherein, when a central angle around a center of the circumferential direction corresponding to a wavelength of the travelling wave is λθ, each piezoelectric element of the (4/3)n piezoelectric elements has a dimension corresponding to a central angle of λθ/2, and adjacent piezoelectric elements of the (4/3)n piezoelectric elements are spaced apart from each other at intervals each corresponding to a central angle of λθ/4 in the circumferential direction,
    wherein each piezoelectric element includes a piezoelectric body polarized in a thickness direction thereof and a pair of electrodes on respective opposite surfaces of the piezoelectric body, and
    wherein the (4/3)n piezoelectric elements are arranged such that alternating pairs of piezoelectric elements are polarized in opposite directions.

2. The piezoelectric oscillator according to claim 1, wherein the oscillating body is formed of a plate-shaped elastic material.

3. The piezoelectric oscillator according to claim 1, wherein the (4/3)n piezoelectric elements are disposed so as to be positioned on antinodes of oscillation of the B (1, n) mode standing waves.

4. The piezoelectric oscillator according to claim 3, wherein the (4/3)n piezoelectric elements are disposed on the antinodes of the oscillation of the B (1, n) standing waves, the antinodes positioned inside annular nodes of the B (1, n) mode standing waves.

5. The piezoelectric oscillator according to claim 4, wherein the (4/3)n piezoelectric elements are disposed inside the annular nodes of the oscillation of the B (1, n) mode standing waves so as not to extend to the outside of the annular nodes.

6. The piezoelectric oscillator according to claim 5, further comprising a second plurality of piezoelectric elements disposed outside of the annular nodes.

7. The piezoelectric oscillator according to claim 6, wherein the second plurality of piezoelectric elements are each disposed in a position adjacent to a respective piezoelectric element of the (4/3)n piezoelectric elements, and are polarized in a direction opposite thereto.

8. The piezoelectric oscillator according to claim 1, wherein the (4/3)n piezoelectric elements each have a rectangular planar shape.

9. The piezoelectric oscillator according to claim 1, wherein the (4/3)n piezoelectric elements each have a circular planar shape.

10. The piezoelectric oscillator according to claim 1, further comprising at least one contact that protrudes from the second surface of the oscillating body.

11. The piezoelectric oscillator according to claim 10, wherein the at least one contact comprises a plurality of contacts that are distributed in an annular area corresponding to where the travelling wave propagates.

12. An ultrasonic motor comprising:
    a stator including the piezoelectric oscillator according to claim 1, and
    a rotor that is arranged so as to contact the stator and rotate due to oscillation caused by the n-wave travelling wave.

* * * * *